United States Patent [19]

Lirman

[11] Patent Number: 4,498,070

[45] Date of Patent: Feb. 5, 1985

[54] SEMI-CONDUCTOR TRANSDUCER AND METHOD OF MAKING THE SAME

[76] Inventor: Irving R. Lirman, 1516 Palisades Dr., Pacific Palisades, Calif. 90272

[21] Appl. No.: 509,359

[22] Filed: Jun. 30, 1983

[51] Int. Cl.[3] .................... H01C 13/00; G01L 1/22

[52] U.S. Cl. .................... 338/42; 338/4; 29/610 SG; 357/26; 73/720; 73/726

[58] Field of Search .................... 338/2-5, 338/36, 42; 73/720-721, 726-727; 357/26; 29/610 SG

[56] References Cited

U.S. PATENT DOCUMENTS

| | | | |
|---|---|---|---|
| 3,389,362 | 6/1968 | McLellan | 338/4 |
| 3,918,019 | 11/1975 | Nunn | 73/726 X |
| 3,970,982 | 7/1976 | Kurtz et al. | 338/4 |
| 4,051,451 | 9/1977 | Kurtz et al. | 338/4 X |
| 4,063,209 | 12/1977 | Kurtz et al. | 338/42 X |
| 4,188,258 | 2/1980 | Mounteer et al. | 338/2 X |
| 4,327,350 | 4/1982 | Erichsen | 338/4 |
| 4,368,575 | 1/1983 | Erichsen et al. | 29/610 SG |
| 4,432,007 | 2/1984 | Cady | 338/4 X |

OTHER PUBLICATIONS

Esashi, "Fabrication of Catheter-Tip and Sidewall Miniature Press. Sensors", IEEE Transactions on Electron Devices vol. ED29, No. 1, Jan. 1982, pp. 57-63.

*Primary Examiner*—Roy N. Envall, Jr.
*Assistant Examiner*—C. N. Sears
*Attorney, Agent, or Firm*—Gerald L. Price

[57] ABSTRACT

An electrically isolated semi-conductor transducer and method of making the same wherein a unitary piece of silicon material having opposed flat surfaces is carved out about a central portion thereof through one flat surface forming a toroidally-shaped cavity having curved bottom surfaces partway through said material surrounding a push rod having an upper flat surface lying in the same horizontal plane as the remainder of said carved out flat surface. The upper flat surface of the push rod and the curved carved surfaces surrounding the push rod are etched exposing the silicon material. A plurality of strain gages are provided on the opposite flat uncarved surface of said silicon material. These strain gages may include four diffused silicon strain gages at spaced locations along said uncarved surface. The opposite carved surface of said silicon material is then bonded to a material, such as a quartz diaphragm, electrically isolating the silicon material when the electrically isolating material is placed against a surface where pressure acting thereon is to be measured. In operation, the strain gages are electrically connected to form a Wheatstone bridge. That is, the two outer oppositely disposed gages may be in compression and the two inner gages in tension. Thus, any change in resistance of the gages produces a voltage or current output to measure the pressures acting on the undersurface of the electrically isolating material.

16 Claims, 7 Drawing Figures

22 14 16 17 18 19 20 13 10 25 23 21 29 26 24

10

11
10
12

IV
10
13
11
14
12

15
IV

SEMI-CONDUCTOR TRANSDUCER AND METHOD OF MAKING THE SAME

BACKGROUND OF THE INVENTION

Field of the Invention

The invention relates to semi-conductor pressure transducers; and, more particularly, to a silicon transducer having a central integral push rod adapted to transmit pressure applied to the base of the rod to strain gages on the transducer.

It is well known in the art to make pressure transducers having a diaphragm and strain gages embedded therein. Pressure is applied to one side of the diaphragm and the pressure is measured, via the strain gages, on the othe side of the diaphragm. Silicon is a well-known material used in such diaphragms These electrical pressure transducers are used on hospital patients to monitor body functions, such as blood pressure. Dury heat surgery, it is often necessary to use defibulation apparatus, such as pads or electrodes, and these devices involve the use of high voltages. Prior art transducers which have been used in the past to monitor such function usually are blown or damaged or destroyed by the use of such high voltage defibulation apparatus. Further, the patient may be injured when the monitor transducer supplies a direct return to ground for the current.

Also, there are many industrial applications where such transducers are exposed to harsh and corrosive atmospheres. If the diffused sensors of such transducers are exposed to such a harsh environment, they will soon be degraded and rendered useless. There is a need for a transducer that is electrically isolated from the application area thereby keeping the sensors therein shielded from corrosive atmospheres thereby preserving the integrity of such transducers.

As was heretofore mentioned, various prior art transducers are known. In U.S. Pat. No. 4,188,258 to Mounteer et al, a transducer is disclosed having a metal strain gage material formed in a flexible silicon diaphragm. A plurality of spaced mesas are etched into the depth of the diaphragm. These mesas result in a greater strain and bending of the diaphragm in the thinner portions thereof and less strain where the mesas are left intact thereby making the diaphragm prone to blowing in high voltage applications.

In U.S. Pat. No. 4,327,350 to Ericksen, a method of making a pressure transducer is disclosed. Although he does discuss a diaphragm driving a post, the post is not integral and must be bonded at both ends resulting in weakened areas.

In U.S. Pat. No. 4,051,451, a transducer is disclosed having a non-integral push rod. The rod is a loose fitting rod capable of independent up and down movement. It is not bonded but held in place by glass guides and spring means. The rod is used to activate a diffused beam as the sensor. Again, such an arrangement is prone to blowing in high voltage operations.

It can be seen that no prior art electrical pressure transducer includes a single integral push rod. Thus, stress is induced in the sensing elements of such prior art devices.

There is thus a need for an electrical pressure transducer having a silicon diaphragm with a single integral push rod, the silicon diaphragm being electrically isolated from the application area thus making the sensor diaphragm a slave of the isolating diaphragm.

SUMMARY OF THE INVENTION

It is an object of this invention to provide an electrial pressure transducer having an electrically isolated silicon diaphragm having an integral push rod.

It is a further object of this invention to provide a method of making an improved electrical pressure transducer where very little stress in the sensing elements thereof is present during use.

It is still further an object of this invention to provide an improved electrical pressure transducer and method for making the same which can handle high voltage applications without damage thereto.

These and other objects are preferably accomplished by providing a unitary piece of silicon material having opposed flat surfaces and carving the piece about a central portion thereof through one flat surface forming a toroidally-shaped cavity having curved bottom surfaces partway through the material surrounding a push rod having an upper flat surface lying in the same horizontal plane as the remainder of said carved out flat surface. The upper flat surface of the push rod and the curved carved surfaces surrounding the push rod are then etched exposing the silicon material. A plurality of strain gages are provided on the opposite flat uncarved surface of said silicon material. These strain gages may include four diffused silicon strain gages at spaced locations along said uncarved surface. The opposite carved surface of said silicon material is then bonded to a material, such as a quartz diaphragm, electrically isolating the silicon material when the electrically isolating material is placed against a surface where pressure acting thereon is to be measured. In operation, the strain gages are connected to form a Wheatstone bridge. That is, the two outer oppositely disposed gages may be in compression and the two inner gages in tension. Thus, any change in resistance of the gages produces a voltage or current output to measure the pressures acting on the undersurface of the electrically isolating material.

DESCRIPTION OF THE PREFERRED EMBODIMENT

Figure 1:
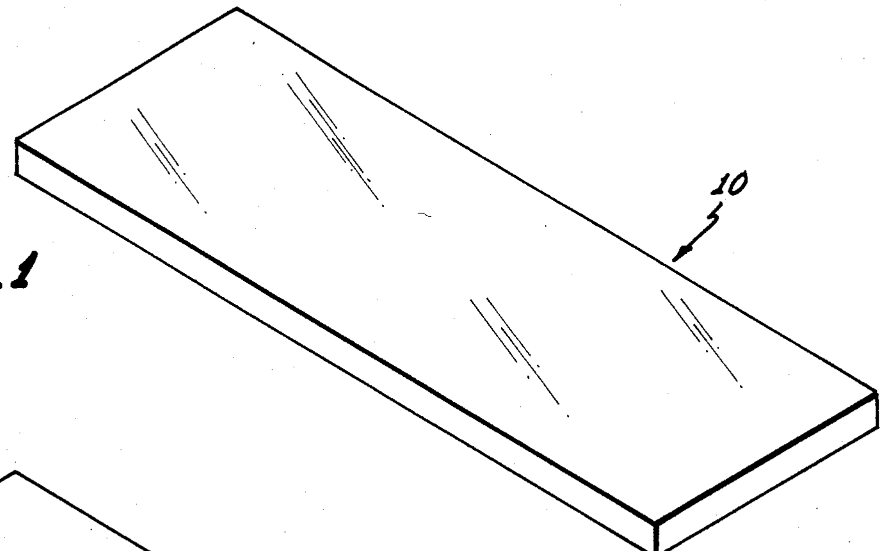
FIG. 1 is a perspective view of a silicon block used to make the transducer of the invention.

Referring now to FIG. 1 of the invention, a diaphragm block 10 of a flat relatively thin piece of silicon material is shown. The silicon material is produced by means well known in the art, as, for example, by growing a large, single crystal in a melt of silica which contains a doping agent such as arsenic or phosphorus. The large crystal is then sliced and cut into thin wafers which can be lapped to the desired thickness and etched in an appropriate silicon etching bath to remove surface defects. Any suitable dimensions may be used. For example, the base or block 10 may be a phosphorus-doped silicon having N-type conductivity characteristics. The base 10 may be cut from a single crystal measuring 3.75 mm. in length and 1.25 mm. in width, with a depth of approximately 0.125 mm. The molecular orientation of the illustrated silicon crystal may be measured by well-known X-ray diffraction techniques. This orientation measurement is usually specified by the silicon wafer supplier or manufacturer. For example, base 10 of FIG. 1 may be formed of monocrystalline silicon cut along the [100] crystallographic plane.

In assembling the pressure transducer, the single crystal silicon base 10 is first polished on both sides. Then, by a wet oxidation process, an initial layer of silicon dioxide is grown on both sides of the base to a thickness of approximately 1000 angstroms (A).

Base 10 may also be photolithographically processed to provide reference marks and circuit patterns for proper placement and formation of the transducer components as is well known in the art.

Figure 2:
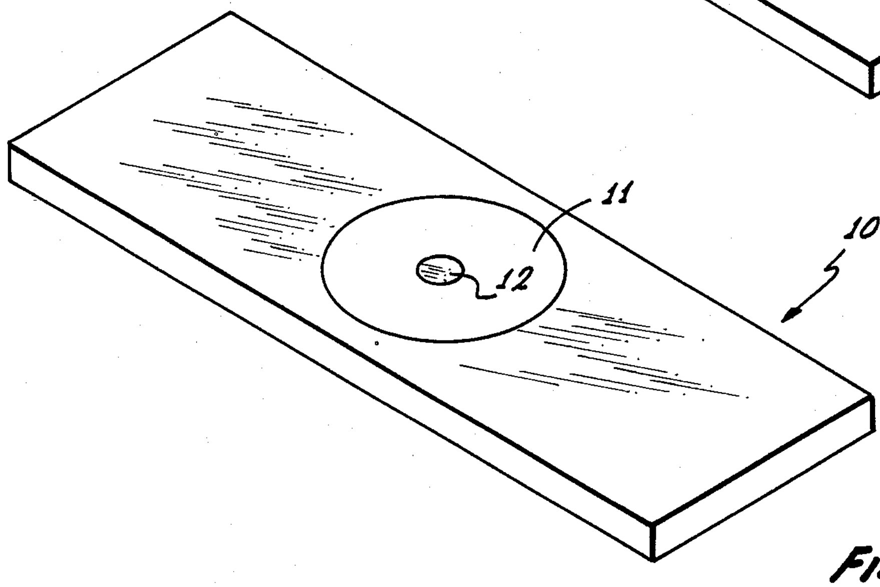
FIG. 2 is a perspective view of the block of FIG. 1 showing a first step in the fabrication of the transducer of the invention.
Figure 3:
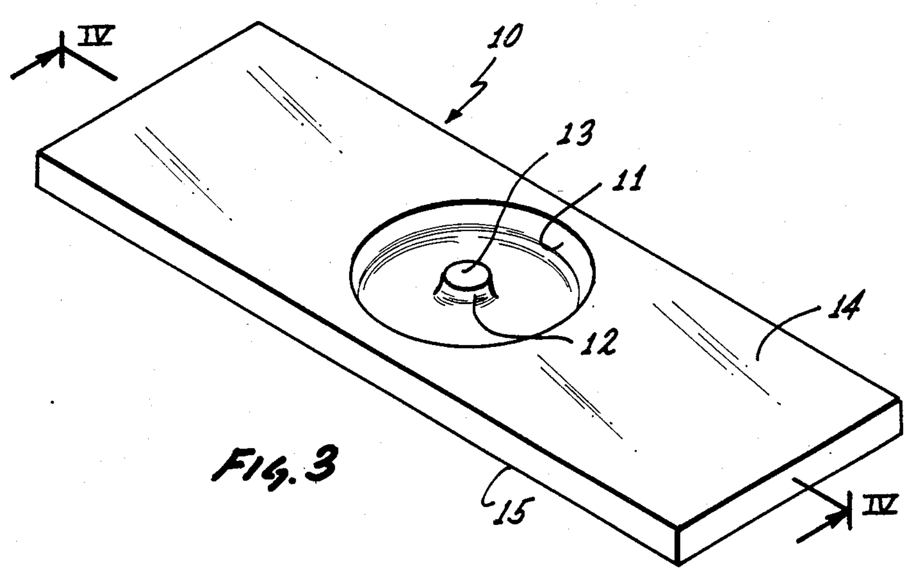
FIG. 3 is a perspective view of the block of FIGS. 1 and 2 showing a further step in the fabrication of the transducer of the invention.
Figure 4:
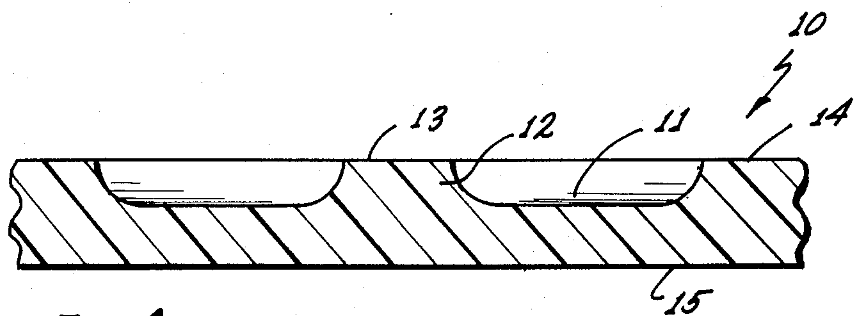
FIG. 4 is a view of the block of FIG. 3 taken along lines IV—IV thereof.

As seen in FIG. 2, a toroidally-shaped depression 11 is then formed in base 10, as by a suitable chemical process, about a generally central point thereby forming an integral push rod 12 (see also FIG. 4). The exposed surface of depression 11 and the upper flat plateau 13 of push rod 12 are etched to expose the silicon material (FIG. 3). As seen in FIG. 4, the flat plateau 13 lies in the same horizontal plane as the remaining flat portion 14 of the base 10 surrounding rod 12.

Figure 5:
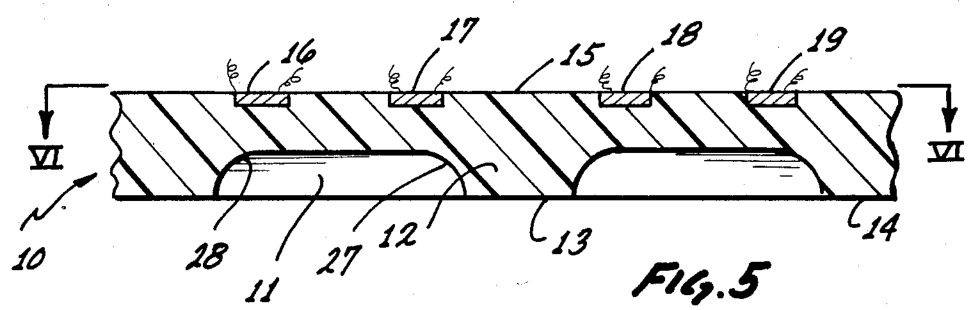
FIG. 5 is a side view of the block of FIG. 4 showing the strain gages embedded therein.
Figure 6:
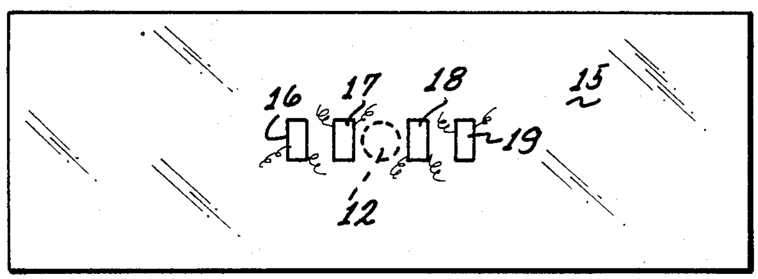
FIG. 6 is a view taken along lines VI—VI of FIG. 5.

As seen in FIGS. 5 and 6, the uncarved flat surface 15 is provided with a plurality of sensors of a piezoresistive material, such as diffused silicon strain gages, as gages 16 through 19, as is well known in the art. The gages 16 through 19 are selected for optimum piezoresistive properties along the crystallographic axis of base 10 and positioned on both sides of rod 12 so that sensors 16 and 19 will be under compression and sensors 17 and 18 will be under tension when rod 12 is deflected responsively to the deflection of the diaphragm, as is well known in the art and which will be discussed further hereinbelow. In particular, sensors 16 and 19 are disposed away from rod 12 on opposite sides thereof adjacent the base ends so that they will be undercompression while sensors 17 and 18 adjacent to and on opposite sides of rod 12 will be under tension. The sensors 16 through 19 are connected together and to suitable terminals (not shown) to form a bridge circuit with a power source and a meter connected to the bridge, all as is well known in the art, and described in detail in U.S. Pat. Nos. 4,327,350 and 4,188,258, the teachings of which are incorporated herein by reference.

In this manner, pressures acting on the surface 29 of quartz diaphragm 21, as indicated by arrows 26, are measured via gages 16 to 19 while the gages 16 to 19 are electrically isolated from such pressures.

Figure 7:
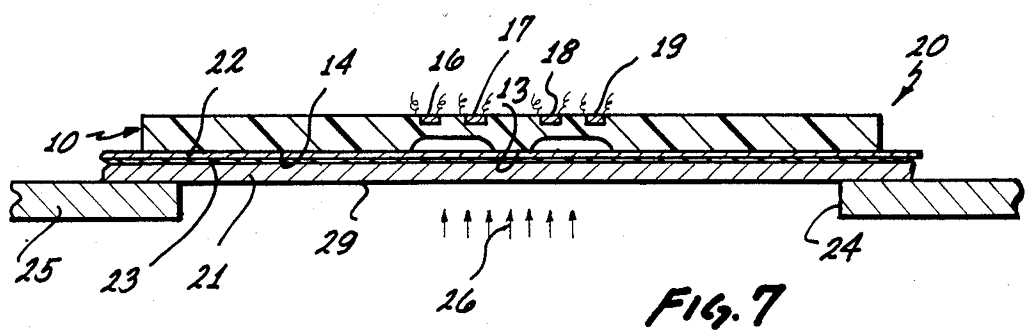
FIG. 7 is a side view of the completed transducer of the invention shown in application of use.

The completed transducer 20 is shown in FIG. 7. A thin flat electrically isolating diaphragm, such as a thin quartz sheet 21, is hermetically sealed to the base 10 as by bonding to the flat plateau 13 of rod 12 and the surrounding flat surface 14 of base 10. Diaphragm 21 may be bonded to base 10 in any suitable manner. For example, metallic gold, epoxy or silver brazing, such as bond 22, may be used between base 10 and a titanium bonding 23 between bond 22 and the thin flat diaphragm 21.

One bonding process to join base 10 to diaphragm 21 may be the well known gold-silicon eutectic procedure where bonding is achieved at temperatures above 380 degrees C. and the interface between the silicon and gold forms a melt which provides a physical bond when the external temperature is removed. Another procedure is sintered nickel metal bonded to the silicon base 10 and evaporated or sputtered copper and nickel bonded to the quartz plate 21. A silver plate is applied to the nickel metal to improve wetting during the sealing process. The two materials are then bonded with solder brazing silver compounds.

Epoxy bonding may be used. Also, fired glass frits with close coefficients of expansion to silicon and quartz may be used to achieve a bond.

Since diaphragm 21 is of an electrically isolating material, e.g., quartz, the electrical portion of transducer 20 on the opposite side of diaphragm 21 is necessarily electrically isolated from any gas or liquid pressures operating on the diaphragm 21. This is shown in FIG. 7 wherein the transducer 20 is placed over a port 24 in an application 25 where gases or liquids under pressure operate, as indicated by arrows 26, on the surface of diaphragm 21 opposite base 10. The negative and positive pressures operating on diaphragm 21 are transmitted to gages 16 through 19 which thereby measures the resistance changes. The quartz diaphragm 21 provides effective electrical isolation so little if any stress is induced in sensors 16 to 19. The integral push rod 12 measures the resistance in a manner making the sensor diaphragm (i.e., the portion of transducer 20 on the opposite side of quartz diaphragm 21) a slave to the quartz diaphragm 21. The diffused electrical sensors or gages 16 to 19 are removed and isolated from electrical conduction operating on the other side of quartz diaphragm 21.

Since rod 12 is integral with and formed from the same piece of unitary material forming the remainder of base 10, the bottom of the push rod (i.e., plateau 13) and the bottom of the transducer body (i.e., surface 16) are in the exact horizontal plane. When bonded to the flat quartz diaphragm, very little if any stress is induced in the sensors 16 to 19.

Modern transducers are so small that it is impossible to get access into the internal area thereof to insert a small push rod to fix it into exact position and bound it therein. If it wasn't bonded in the proper position, the sensors might lock into a distorted position rather than an "at rest" position which would give erroneous readouts. Thus, it is critical that the push rod be integral in the sensing diaphragm.

As seen in FIGS. 5 to 7, since the push rod 12 is centrally located, the two sensors 17 and 18 are placed adjacent to the point where sidewall 27 (FIGS. 5 and 7) of rod 12 joins the depression 11. This removes the sensors away from the exact center of the base 10 so as to optimize use of tension in center gages 17,18 and compression in the outer peripheral gages 16,19. These gages 16,19 are located in surface 15 where the inner peripheral wall 28 of surface 14 meets depression 11 (and inwardly of the ends of surface 15).

Although diaphragm base 10 is disclosed as rectangular, obviously it may be any suitable configuration, such as circular or square, with rod 12 generally centrally located.

Although gages 16 through 19 have been disclosed as diffused, and embedded in the base 10, obviously any suitable gages may be used, such as external gages cemented or otherwise bonded to surface 15.

It can be seen that I have disclosed a semi-conductor transducer and method of making the same which can be easily and inexpensively manufactured and which measures pressures acting thereon while maintaining the pressure-measuring means electrically isolated from such pressures.

I claim:

1. A semi-conductor pressure transducer, comprising:

a thin silicon block having substantially parallel, flat upper and lower surfaces;

said lower surface being relieved to define a hemitoroidally-shaped cavity extending partially through said block, the cavity surfaces defining an unrelieved peripheral portion and a generally centrally located push rod, said push rod and said peripheral portion being integral with said block and having outer surfaces which are substantially coplanar;

a plurality of spaced strain gages mounted on said upper surface; and a thin flat diaphragm of an electrically inert material bonded to the unrelieved portions of the lower surface of said block, said diaphragm electrically isolating said silicon base and said gages from pressure acting on the surface of said diaphragm opposite the surface to which said block is bonded.

2. A transducer as in claim 1, wherein said strain gages are mounted on said upper surface within an area defined by the plane of an extension of said cavity to a point tangential to said upper surface.

3. A transducer as in claim 2, wherein four said strain gages are disposed on said upper surface in a straight line, a first pair of gages being disposed at a point tangential to, on opposite sides of, and outwardly from the smaller diameter circle defined by the plane of an extension of the cavity to a point tangential to said upper surface, and a second pair of gages being disposed tangential to, on opposite sides of, and inwardly from the larger diameter circle defined by the plane of an extension of the cavity to a point tangential to said upper surface.

4. In the transducer of claim 1 wherein said flat surface of said push rod and the exposed surfaces of said cavity are etched.

5. In the transducer of claim 1 wherein said diaphragm is quartz.

6. In the transducer of claim 4 wherein said quartz diaphragm is bonded to said base by a metallic bonding bonded to said base and a second intermediate titanium bonding between said diaphragm and said first bonding.

7. In the transducer of claim 1 wherein said gages are four diffused silicon gages disposed along said first surface and embedded therein.

8. In the transducer of claim 1 wherein said push rod is generally circular in cross-section.

9. A transducer comprising:

a first main thin flat silicon base having a first upper surface and a second lower surface;

a cavity carved partway through said base through said lower surface thereof about a portion of said base forming an integral push rod surrounded by said cavity;

the outer surface of said push rod being flat and lying in the same horizontal plane as the remaining uncarved flat portion of said lower surface surrounding said push rod;

a plurality of spaced strain gages mounted on said upper surface; and a thin flat diaphragm of an electrically inert material bonded to said flat surface of said push rod and the remaining uncarved flat portion of said lower surface thereby electrically isolating said silicon base and said gages from pressures acting on the surface of said diaphragm opposite the surface to which said base is bonded.

10. A method of making a transducer from a flat thin piece of silicon comprising the steps of:

carving a hemitoroidally-shaped cavity partially through said piece on one side flat surface thereof leaving a generally centrally located push rod having a flat upper surface lying in the same horizontal plane as the remaining uncarved surface of said one flat surface;

bonding a plurality of spaced strain gages along the other flat surface of said piece; and bonding said flat upper surface of said push rod and the uncarved surface of said one flat surface to a thin sheet of an electrically inert material.

11. In the method of claim 10 wherein the step of bonding said flat upper surface of said push rod and the uncarved surface of said one flat surface to a thin sheet of an electrically inert material includes the step of bonding to a thin sheet of quartz.

12. In the method of claim 10 wherein the step of bonding a plurality of spaced strain gages includes the step of embedding diffused silicon strain gages in said other flat surface.

13. The method of claim 10, wherein said strain gages are bonded on said upper surface within an area defined by the plane of an extension of said cavity to a point tangential to said upper surface.

14. The method of claim 13, wherein four said strain gages are disposed on said upper surface in a straight line, a first pair of gages being disposed at a point tangential to, on opposite sides of, and outwardly from the smaller diameter circle defined by the plane of an extension of the cavity to a point tangential to said upper surface, and a second pair of gages being disposed tangential to, on opposite sides of, and inwardly from the larger diameter circle defined by the plane of an extension of the cavity to a point tangential to said upper surface.

15. In the method of claim 14 wherein the step of bonding said first pair includes bonding gages under tension and the step of bonding said second pair includes the step of bonding gages under compression.

16. A method of making a transducer from a flat thin piece of silicon material comprising the steps of:

carving a cavity partway through one flat surface of said piece leaving a push rod having a flat upper surface lying in the same horizontal plane as the remaining uncarved surface of said one flat surface;

bonding a plurality of spaced strain gages along the other flat surface of said piece; and bonding said flat upper surface of said push rod and the uncarved surface of said one flat surface to a thin sheet of an electrically inert material.

* * * * *